United States Patent
Cooper et al.

(10) Patent No.: US 11,108,883 B2
(45) Date of Patent: Aug. 31, 2021

(54) SYSTEMS AND METHODS FOR REMOTE NETWORK TOPOLOGY DISCOVERY

(71) Applicant: Google Inc., Mountain View, CA (US)

(72) Inventors: Nicholas Mark Vasic Cooper, Annandale (AU); Max Ward-Graham, Perth (AU)

(73) Assignee: Google LLC, Mountain View, CA (US)

( * ) Notice: Subject to any disclaimer, the term of this patent is extended or adjusted under 35 U.S.C. 154(b) by 321 days.

(21) Appl. No.: 14/845,577

(22) Filed: Sep. 4, 2015

(65) Prior Publication Data
US 2017/0070593 A1 Mar. 9, 2017

(51) Int. Cl.
*H04L 29/08* (2006.01)
*H04L 12/24* (2006.01)

(52) U.S. Cl.
CPC .......... *H04L 67/32* (2013.01); *H04L 41/12* (2013.01); *H04L 67/06* (2013.01); *H04L 67/1002* (2013.01); *H04L 67/104* (2013.01); *H04L 67/1063* (2013.01)

(58) Field of Classification Search
CPC ..... H04L 67/06; H04L 67/1002; H04L 67/32; H04L 41/12; H04L 67/104; H04L 67/1063; G06F 11/0709; G06F 11/1425
USPC .................. 709/217, 230; 370/315; 380/255; 463/42; 455/524
See application file for complete search history.

(56) References Cited

U.S. PATENT DOCUMENTS

| | | | |
|---|---|---|---|
| 7,567,523 B2 | 7/2009 | Black et al. | |
| 8,108,715 B1 * | 1/2012 | Agarwal | G06F 11/0709 714/10 |
| 8,543,681 B2 | 9/2013 | Bearden et al. | |
| 9,730,096 B2 * | 8/2017 | Boyd | H04W 24/10 |

(Continued)

FOREIGN PATENT DOCUMENTS

| | | |
|---|---|---|
| CA | 2701107 | 6/2009 |
| CN | 101232415 A * | 7/2008 |

(Continued)

OTHER PUBLICATIONS

Spring, Neil Timothy, "Efficient discovery of network topology and routing policy in the Internet," Program authorized to offer degree: Computer Science and Engineering, University of Washington (2004) (220 pages).

(Continued)

*Primary Examiner* — Tonia L Dollinger
*Assistant Examiner* — Schquita D Goodwin
(74) *Attorney, Agent, or Firm* — Lowenstein Sandler LLP

(57) ABSTRACT

Systems and methods are disclosed herein for obtaining data about a network having at least a first node and a second node. A server transmits to the first node a first request for the first node to send a communication to the second node. The server is outside of the network, and the first request includes a first address of the first node and a second address of the second node. The server receives, from the first node, an indication of whether the communication to the second node is successful. The server receives, from the first node, a second request for access to a file stored on the server, determines that the file is stored locally at the second node, and transmits, to the first node, an instruction to retrieve the file from the second node, when the communication to the second node is successful.

20 Claims, 6 Drawing Sheets

(56) References Cited

U.S. PATENT DOCUMENTS

| | | | |
|---|---|---|---|
| 2002/0198991 A1 | 12/2002 | Gopalakrishnan et al. | |
| 2006/0212542 A1* | 9/2006 | Fang | H04L 67/104 709/219 |
| 2007/0130626 A1* | 6/2007 | Kato | G06F 8/61 726/27 |
| 2007/0245033 A1 | 10/2007 | Gavrilescu et al. | |
| 2007/0277202 A1* | 11/2007 | Lin | H04N 21/4661 725/46 |
| 2007/0294422 A1* | 12/2007 | Zuckerman | G06F 17/30206 709/230 |
| 2008/0225866 A1* | 9/2008 | Sehgal | H04L 69/16 370/401 |
| 2009/0006538 A1* | 1/2009 | Risney, Jr. | G06F 8/61 709/203 |
| 2009/0037428 A1* | 2/2009 | Achtermann | G06F 17/30902 |
| 2009/0116404 A1 | 5/2009 | Mahop et al. | |
| 2009/0138576 A1* | 5/2009 | Sekimoto | H04L 67/104 709/219 |
| 2010/0112955 A1* | 5/2010 | Krishnaswamy | G06F 1/329 455/67.11 |
| 2010/0159948 A1* | 6/2010 | Spivey | H04L 12/10 455/456.1 |
| 2010/0306360 A1 | 12/2010 | Duggan et al. | |
| 2012/0057518 A1* | 3/2012 | Herrala | H04W 84/20 370/315 |
| 2012/0059932 A1* | 3/2012 | Messer | H04L 12/00 709/224 |
| 2012/0092997 A1* | 4/2012 | Mihaly | H04L 67/28 370/237 |
| 2012/0254364 A1* | 10/2012 | Vijayan | H04L 65/4084 709/219 |
| 2013/0005389 A1* | 1/2013 | El Mghazli | H04L 67/104 455/524 |
| 2013/0086197 A1* | 4/2013 | Ho | G06Q 10/00 709/212 |
| 2013/0117413 A1* | 5/2013 | Kaneko | H04N 21/438 709/217 |
| 2013/0208888 A1* | 8/2013 | Agrawal | H04L 67/1021 380/255 |
| 2013/0297887 A1* | 11/2013 | Woodward | G06F 12/0862 711/137 |
| 2014/0045596 A1* | 2/2014 | Vaughan | A63F 13/216 463/42 |
| 2014/0206403 A1* | 7/2014 | Buckley | H04W 4/14 455/466 |
| 2014/0304408 A1* | 10/2014 | Rhee | H04L 1/20 709/224 |
| 2015/0104170 A1* | 4/2015 | Xia | H04J 14/0202 398/48 |
| 2015/0222728 A1* | 8/2015 | Dhand | H04L 67/325 709/219 |
| 2015/0280999 A1* | 10/2015 | Chart | H04L 41/12 709/224 |
| 2015/0281074 A1* | 10/2015 | Kubota | H04L 45/745 370/315 |
| 2016/0127958 A1* | 5/2016 | Viswanathan | H04W 8/06 370/331 |
| 2016/0182626 A1* | 6/2016 | Endahl | H04L 67/1095 709/203 |
| 2016/0192150 A1* | 6/2016 | Plasmeier | H04W 4/027 455/456.1 |
| 2016/0218963 A1* | 7/2016 | Nauck | H04L 45/70 |

FOREIGN PATENT DOCUMENTS

| | | |
|---|---|---|
| CN | 101232415 A | 7/2008 |
| CN | 101394423 A | 3/2009 |
| CN | 103701619 A | 4/2014 |
| EP | 0 841 772 | 5/1998 |
| JP | 2006261880 A * | 9/2006 |
| JP | 2006261880 A | 9/2006 |
| WO | WO 2013052714 | 4/2013 |
| WO | 2015028774 A1 | 3/2015 |

OTHER PUBLICATIONS

SolarWinds Network Topology Mapper Administrator Guide—01.29.15 version 2.2.0 http://www.solarwinds.com/documentation/NTM/docs/NTMAdminGuide.pdf (64 pages).

PCT International Search Report and Written Opinion for International Application No. PCT/US2016/049615, dated Nov. 14, 2016, 9 pages.

Chinese Patent Application No. 201680030290.1, Office Action dated Mar. 19, 2020, 17 pages.

Chinese Patent Application No. 201680030290.1, Office Action dated Sep. 30, 2020, 10 pages.

* cited by examiner

US 11,108,883 B2

SYSTEMS AND METHODS FOR REMOTE NETWORK TOPOLOGY DISCOVERY

FIELD OF THE INVENTION

In general, this disclosure relates to discovery of the topology of a remote network.

BACKGROUND

Existing systems that discover network topology are typically already part of the network itself, such that the discovery tools have direct and immediate access to information about the network. In particular, when a node in the network attempts to discover the network's topology, the node may use its direct local connections to other nodes in the network to build a model of the network. The discovery tool benefits when it is a part of the network by having direct, fast, and reliable access to the network. In contrast, when the network is remote from the system that is trying to discover the topology of that network, access to the network is limited and can be slow because the discovery tool is not part of the network.

SUMMARY

Systems and methods are disclosed herein for discovering the topology of a remote network. One aspect relates to a system or method for obtaining data about a network having at least a first node and a second node. A server transmits to the first node a first request for the first node to send a communication to the second node. The server is outside of the network, and the first request includes a first address of the first node and a second address of the second node. The server receives, from the first node, an indication of whether the communication to the second node is successful. The server may receive, from the first node, a second request for access to a file stored on the server, determine that the file is stored locally at the second node, and transmit, to the first node, an instruction to retrieve the file from the second node, when the communication to the second node is successful.

Another aspect relates to a system including means for a server that is outside of a network to obtain data about the network having at least a first node and a second node. The system includes means for transmitting to the first node a first request for the first node to send a communication to the second node, where the first request includes a first address of the first node and a second address of the second node, and means for receiving, from the first node, an indication of whether the communication to the second node is successful.

In some implementations, the system further includes means for receiving, from the first node, a second request for access to a file stored on the server, means for determining that the file is stored locally at the second node, and means for transmitting, to the first node, an instruction to retrieve the file from the second node, when the communication to the second node is successful.

In some implementations, the system further includes means for identifying a temporal pattern of the first node entering and exiting the network, and means for identifying a file that is stored on the server as being previously accessed by the first node. The system may further include means for determining that the second node has more storage capacity than the first node, means for transmitting, to the second node, a copy of the file, and in response to receiving a second request from the first node for access to the file, means for transmitting an instruction to the first node to retrieve the file from the second node. The means for determining that the second node has more storage capacity than the first node may include means for receiving an indication of a device type at each of the first node and the second node.

In some implementations, the system further includes means for receiving, from the first node, a link delay between the first node and the second node when the communication to the second node is successful, and means for updating a network model to reflect the received indication and the received link delay.

In some implementations, the network is a first network, and the first request includes a plurality of second addresses for the second node, where each second address in the plurality of second addresses describes a location of the second node in a plurality of networks including the first network. The system may further include means for receiving, from the first node, another indication of which, if any, of the plurality of second addresses was used to successfully communicate with the second node.

In some implementations, the system further includes means for receiving, from a third node, a message indicating that the first node sent the communication that is meant for the second node to the third node. The means for transmitting the first request may include means for repeating the transmitting at a frequency that is based on a device type of the first node.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the disclosure, certain illustrative embodiments will now be described, including a system for determining the topology of a remote network. In particular, a method is described that allows for using the topology of a remote network to identify files that are predicted to be used by a user on a particular node of the network, and cache those files at the node, before receiving a request to do so from the user. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

It is generally desirable for a server to discover the topology of a network where the network is remote from the system. An understanding of a remote network's topology is particularly useful in a file sharing system. In an example, a user at a first node of the remote network may request access to a file that is stored on the server. If the server has data of the topology of the remote network, and also has data indicating that at least one other node of the remote network has a version of the requested file cached locally, the server may instruct the first node to request the file from the other node that has the file cached. In this manner, the remote connection between the server and the first node is not used for transferring the file, and instead the file may be transferred over a reliable, local, and fast connection within the remote network.

In an example, two devices may be connected to the same local network, which is remote from a cloud-based file sharing system. If both devices are associated with the same organization, the same user, or the same set of files stored on the cloud-based file sharing system, a server on the file sharing system may be able to exploit information that the two devices are connected to the same network to instruct either device to communicate with the other device over the local network.

Figure 1:
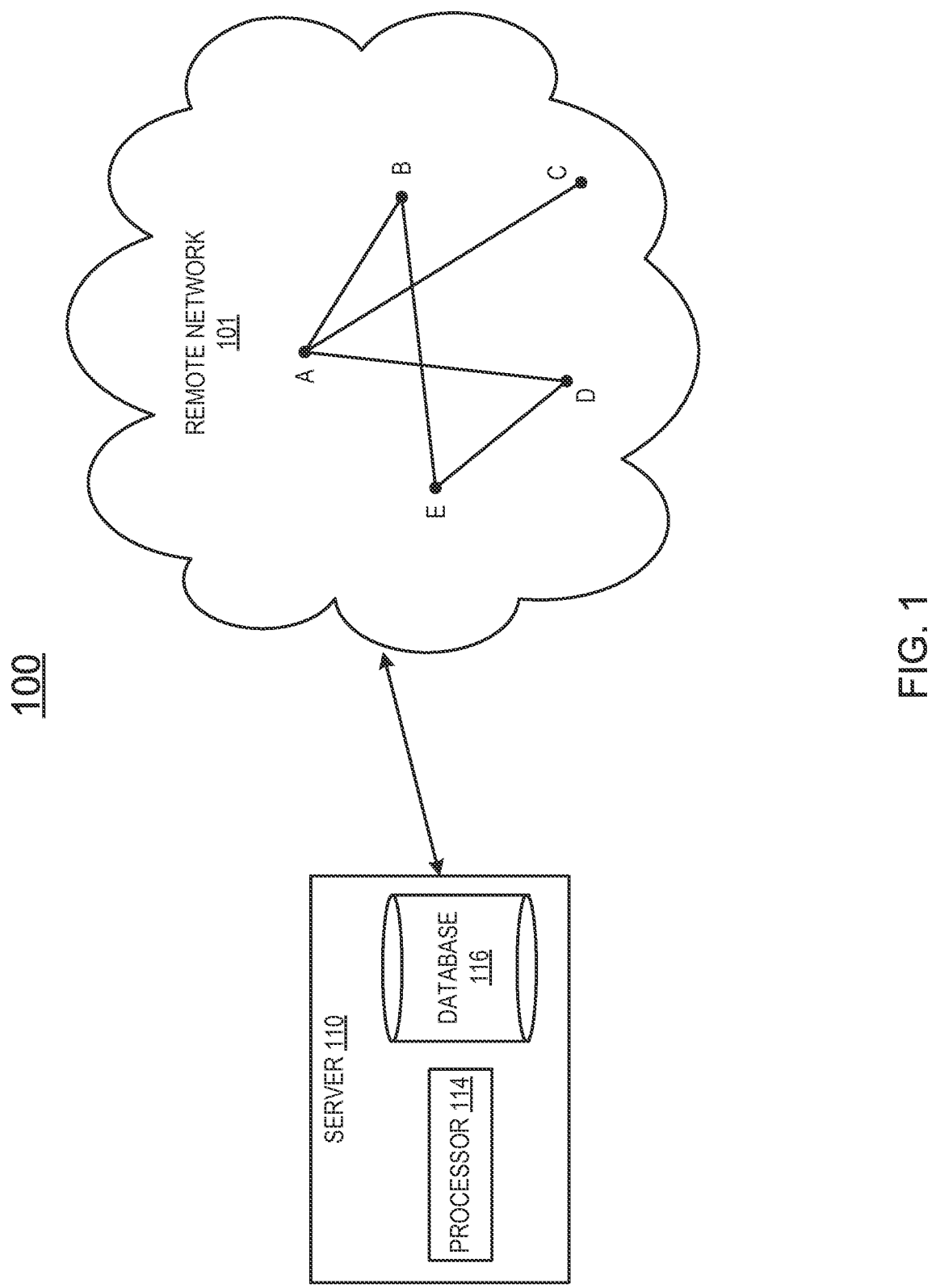
FIG. 1 is a block diagram of a computerized system including a server and remote network structure, according to an illustrative embodiment.

FIG. 1 depicts an example of a server and remote network structure that may be used to implement the systems and methods herein. FIG. 1 is a block diagram of a computerized system 100 for allowing the topology of a remote network 101 to be discovered by a server 110. The server 110 includes a processor 114 and a database 116. The remote network 101 is remote from the server 110 and includes five nodes A, B, C, D, and E. The server 110 may be configured to communicate with one or more of these five nodes, but unable to communicate directly with all nodes in the remote network 101. The server 110 may be included in a web-based storage system (not pictured), which may be a file hosting system that allows users to store, retrieve, and modify data. This data may be referred to as a user's web data, which is stored in user data database. The server 110 may perform functions related to maintaining the user data database, such as allocating memory for the data, receiving new data to be stored in the database, deleting data in the database, providing indications of how much storage space is available in the database, or any other suitable function related to database maintenance. The web-based storage system may be stored on a single server system or in a distributed system and may use cloud storage to store user data.

Five nodes are shown in the remote network 101 of FIG. 1 for illustrative purposes only. In general, one of ordinary skill in the art will understand that the remote network 101 may include any number of nodes, and the nodes may be configured in any suitable topology without departing from the scope of the present disclosure. In an example, the remote network 101 may be in a workplace, where each node in the remote network 101 is a device (such as an office computer, for example) that is connected to a shared network within the workplace. The users of the devices at the nodes may share a certain set of files with one another. Such files may be stored in a cloud storage system including the server 110. However, it may be sometimes undesirable to use the connection between the server 110 and the remote network 101 to transfer such files. In this case, the server 110 may use its knowledge of the topology of the remote network 101 and its knowledge of whether any of the nodes in the remote network 101 have the desired file locally cached to instruct nodes in the remote network 101 to retrieve the desired file from the nodes that have the file cached. While the example described above is in relation to a remote network 101 in a workplace, one of ordinary skill in the art will understand that the present disclosure is applicable to any network in which multiple devices may communicate with one another and may require access to the same set of files, such as in a school, a business, or a home. Moreover, only one remote network 101 is shown in FIG. 1, but any number of remote networks may be remotely connected to the server 110.

Each node in the remote network 101 may include one or more computer systems, processors, mobile devices such as phones or tablets, or any other suitable device that is capable of communicating with another device over a network. As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one server 110 and one remote network 101 are shown in FIG. 1 to avoid complicating the drawing. In general, the system 100 can support multiple servers 110 and any number of remote networks 101. The server 110 may be stored on a single server system or in a distributed system that uses cloud computing resources.

In FIG. 1, node A is directly connected to nodes B, C, and D, and node E is directly connected to nodes B and D. There are no other direct connections shown in the remote network 101. The arrangement and configuration of the direct connections shown in the remote network 101 may be referred to herein as a network topology, which includes a description of the links between various nodes in the remote network 101. In addition to including these direct connections, the network topology may further include information regarding link delay, link status, link reliability, or any suitable combination thereof. It may be desirable for the server 110 to receive information of the topology of the remote network 101, so that the server 110 can provide informed instructions when a first node in the remote network 101 requests a file from the server 110. For example, the server 110 may understand that the requested file is stored locally on a second node in the remote network 101, and may instruct the first node to retrieve the file from the second node, instead of retrieving the file from the server 110. Because local network connections tend to be cheaper, more reliable, and faster than longer and more remote network connections, the present disclosure saves on network costs and efficiency.

The server 110 is remote from the network 101, meaning that the server 110 is not one of the nodes in the network 101 and initially has only limited information regarding the topology of the network 101. One way for the server 110 to discover the topology of the remote network 101 is to transmit a message to one of the nodes in the remote network 101 (e.g., node A) with a request for node A to contact another node in the remote network 101 (e.g., node B). This is described in detail in relation to FIG. 2.

Figure 2:
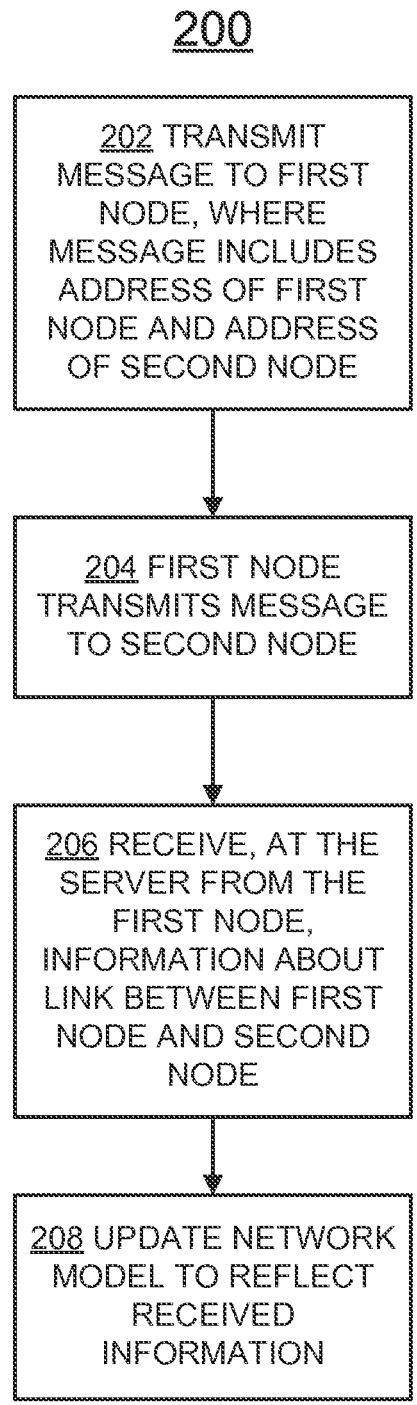
FIG. 2 is a flow chart of an illustrative method for a server to discover the topology of a remote network, according to an illustrative embodiment.

FIG. 2 is a flow chart of an illustrative method 200 for a server, such as the server 110, to discover the topology of a remote network, such as the network 101. Some methods to discover the topology of a network may require a user (such as a network administrator, for example) to explicitly provide information about the network. In contrast, the method 200 is an example automated method of discovering the topology of a remote network 101. The method 200 includes the steps of transmitting a message to a first node in the remote network, where the message includes the address of the first node and the address of a second node in the remote network (step 202), the first node transmitting a message to the second node (step 204), and receiving, at the server from the first node, information about the link between the first node and the second node (step 206).

At step 202, the server 110 transmits a message to a first node (e.g., node A) in the remote network 101, where the message includes the address of the first node and the address of a second node (e.g., node B) in the remote network 101. The address may be a network address such as an IP address or any other suitable label assigned to a device at a node in a network. In general, the address may include a local address, a global address, or both. The local address may refer to the label used by one node to communicate with another node within the same network. The global address may refer to the label used by one node to communicate with a node outside of the network, or with the server 110. Moreover, the address may include multiple local addresses, which may occur if a single device belongs to multiple networks and has different local addresses for the networks to which it belongs.

In some embodiments, the server 110 stores data indicative of all known addresses of the devices at the nodes in the remote network 101, but does not have information indicating which address is local to the remote network 101. While the server 110 may know which address does the node B use to communicate with the server 110, the server 110 may not know which address does the node B use to communicate with other nodes within the remote network 101, such as the node A. In this case, the message transmitted at step 202 includes each known address for the devices at node A and/or node B, and the node A is instructed to attempt to use each of B's addresses. In another example, one message may be sent for each known address for the node B.

In some embodiments, the message transmitted at step 202 includes a list of specific fields for the node A to include in its reply to the server 110. In an example, the message may include a request for the node A to return specific information about the communications link between the node A and the node B, such as the link delay, the link status, the link reliability, or any other characteristic of the link. In other embodiments, the message transmitted at step 202 may include a general request for the node A to reply to the server 110 with every piece of information that the node A has about the communications link between the node A and the node B.

In some embodiments, the message transmitted at step 202 includes a single second node (e.g., the node B), where the node A is specifically instructed to attempt to contact the node B. In other embodiments, the message transmitted at step 202 includes multiple second nodes (e.g., the nodes B, C, D, and E), where the node A is instructed to attempt to contact each of these second nodes. In this case, the message at step 202 is essentially a number of individual requests that are batched together in bulk into a single request. In general, the message may include any number of second nodes, include all nodes (other than the first node A) in the remote network 101 or any subset thereof.

At step 204, the first node A transmits a message to the second node B. This message may include a first timestamp of the time when the first node receives the request, a second timestamp of the time when the first node A transmits the message to the second node B, or both the first and second timestamps. If the message transmitted at step 202 includes multiple second nodes, the first node A may simultaneously (or approximately at the same time) transmit a message to each of the second nodes indicated in the message.

In some embodiments, the message transmitted at step 204 is appended with additional random data. This may be done so that the node B can appropriately gauge the speed of the connection between the nodes A and B because the size of the message may have an effect on the speed of the connection. In particular, if the message transmitted at step 204 is small, the node B may measure a short delay value that is biased because it is not indicative of the true connection speed. However, if the message is appended with additional random data so that the message mimics the size of a typical data packet that would be transmitted over the connection, the delay measured by the node B may be more accurate in describing the connection speed under normal conditions.

At step 206, the server 110 receives from the first node A, information about the link between the first node A and the second node B. In particular, after the step 204, the second node B may transmit information to the first node A, including but not limited to the timestamp that the second node B receives the message transmitted at step 204. In this case, the delay between the time that the first node A transmits the message to the second node B and the time that the second node B receives the message is indicative of one delay on the link between the nodes A and B.

In some embodiments, the link between the nodes A and B is asymmetric, such that transmission on the link in one direction (e.g., from node A to node B) may be faster than transmission on the link in the opposite direction (e.g., from node B to node A). This may result when one device has a more powerful antenna than the other device. The server 110 may store such information in the database structure by calculating a difference between timestamps. In this case, the first delay from node A to node B is computed by subtracting the timestamp that the node A transmits a message from the timestamp that the node B receives the message. This first delay may be computed once the node B receives the message from node A. Similarly, the second delay from node B to node A is computed by subtracting the timestamp that node B transmits a reply to node A's message from the timestamp that the node A receives the reply, and may be computed once the node A receives the reply. The node A may transmit both the first and second delay to the server 110, or the node B may transmit information regarding the first delay directly to the server 110.

In some embodiments, the information that is received at step 206 includes data such as the reliability of the link, the status of the link, or any other suitable information about the link. In one example, the information received at step 206 may include whether there is a direct link between the first node and the second node. In the remote network 101, no direct link exists between the nodes A and E. However, the node A may indirectly communicate with the node E over the nodes B or D. In one example, if the node A is requested to contact the node E, the node A may respond to the server 110 that the node A is not configured to directly communicate with the node E. In this case, the node A may provide to the server 110 an indication of a failed attempt to contact node E. In some embodiments, the message transmitted at step 202 includes an indication of whether the first node A should attempt to contact the second node (e.g., node E), even if no direct link exists between the first and second nodes, or whether the first node A should simply respond with a failure message if no direct link exists.

In some embodiments, the node A may attempt to contact node E indirectly and provide information about the connections between the nodes A and E to the server 110. In general, if no direct link exists (such as between the nodes A and E, for which there is no direct connection in the remote network 101), each node on the path between the first node and the second node may append one or more timestamps to the message as it forwards the message on the path towards the second node. In this way, the node A may indirectly contact the node E via one or both of the nodes B and D. In particular, the node A may request that nodes B or D forward the message to node E. If nodes B or D fulfill this request, nodes B or D may forward the message to node E after appending the message with a timestamp of when it received the request from node A and when it is forwarding the message to node E. Then, node E may respond to the forwarded message by replying with a timestamp of when the node E received the message. In general, the node E may forward this message to the server 110, or may forward the message back along the same path or a different path. In an example, if the node A sent the message to node E via node B, the node E may respond to the node A via node D or node B. Instructing the node A to attempt to contact the node E even when there is no direct link between the nodes A and E may be efficient and may save on transmissions over the connection between the server 110 and the remote network 101. However, such an implementation is somewhat more complicated than the approach in which the first node A simply returns a fail message if there is no direct link to the second node E.

At step 208, the server 110 updates a network model to reflect the information received at step 206. The network model describes the inferred topology of the remote network 101, based on messages received from one or more nodes in the remote network 101. For example, the server 110 may store a database structure that stores information regarding the remote network 101. In particular, the database structure may include a list of previous requests transmitted to various nodes in the remote network 101, and whether those requests were forwarded to destination nodes successfully or not. The database structure may further include the timestamps associated with those requests, such as a timestamp for when the initial request from the server 110 to the first node was transmitted, a timestamp for when the first node received the initial request, a timestamp for when the first node transmitted a message to the second node, a timestamp for when the second node received the message, a timestamp for when the second node transmitted a reply to the message to the first node, a timestamp for when the first node received the reply, or any suitable combination thereof.

In some embodiments, a single device at the second node is associated with multiple addresses, such as one remote address for communicating with the server 110 and one or more local addresses for communicating within one or more networks. In this case, the server 110 may instruct the first node to communicate with the second node using any of the multiple addresses for the second node. Moreover, the server 110 may not have direct access to the local address that the first node uses to communicate with the second node, or the local address that the second node uses to communicate with the first node. In particular, the server 110 may only have information regarding the remote addresses of these nodes, because the remote addresses are used by the server 110 to communicate with these nodes. In this case, the server 110 may include the second node's remote address in the message transmitted at step 202, and the first node may use a lookup table (e.g., that includes the known remote and local addresses of the various nodes in the remote network 101) to identify the local address of the second node. In its response to the server 110, the first node may include an indication of which address was used to contact the second node, and the server 110 may store the second node's appropriate local address.

In some embodiments, if the message transmitted at step 204 is meant for the second node (e.g., the node B) but is instead sent to a third node (e.g., the node C), the third node may reply to the first node (e.g., the node A) with an indication that the third node was not meant to receive the message. In particular, each node may be associated with a unique identifier that is specific to each node. When the node C receives a message that has the unique identifier associated with the node B, the node C may reply to the node A with an indication that it received a message meant for another node. In another example, the third node may reply to the first node with information about its own identity and any related link information described herein. If the node C is within the same remote network 101 as the nodes A and B (as is pictured in FIG. 1), this information that the node C provides to the node A (and is therefore forwarded back to the server 110) is useful for the server 110 in updating the network model at step 208. Alternatively, if the node C is in a different network or is outside of the remote network 101, such information may be less useful. In some embodiments, the node C may be configured to proactively send a communication to the server 110 upon receiving a message from the first node A, where the message was meant for a second node B.

In some embodiments, the network model is updated at step 208 when a node (e.g., node A) informs the server 110 that a link between the node and another node (e.g., node B) is broken. In one example, the link between the nodes A and B may have been working at one point, and the server 110 may have the link stored in the network model. Upon receiving a request for a file that is stored on the server 110 from the node A, the server 110 may use the network model to determine that the requested file is locally cached on the node B. To reduce use of the remote connection between the server 110 and the remote network 101, the server 110 may instruct the node A to retrieve the requested file from the node B. Then, when the node A attempts to contact the node B to retrieve the file, the link between the nodes A and B may be broken. In this case, the node A may inform the server 110 that the link is broken, and the server 110 may update the network model to reflect the broken link.

In some embodiments, the server 110 periodically sends these messages to update its understanding of the network topology. The frequency at which these messages are sent to the nodes in the remote network 101 may be based on the type of the device at a given node and a predicted frequency at which the device's connection to the remote network 101 may change. For example, it may be expected that desktop computers generally will typically always be connected to the remote network 101, while mobile devices such as phones or tablets may be expected to have connections to various remote networks that vary with time. In another example, the frequency at which these update messages are sent to the nodes may be based on the network capacity.

In particular, because desktop computers have generally fixed connections to a network, the server 110 may be configured to only send a request to a desktop computer once or a limited number of times. The message that the server 110 transmits to the node A may include a request for the node A to reply with a type of device that the node A is associated with. If the node A is associated with a desktop computer, the server 110 may only transmit a particular request to the node A once or a small number of times. Alternatively, if the node A is associated with a mobile device, the server 110 may periodically transmit requests to the node A for an update on its network connections. In this manner, the type of device at each node may affect the frequency at which the server 110 requests updates on the device's network connections.

In some embodiments, rather than the server 110 sending periodic messages to various nodes in the remote network 101 to update its understanding of the network topology, the nodes may be configured to proactively transmit messages to the server 110 when changes to its network connections occur. In one example, mobile devices such as smart phones may proactively inform the server 110 when the device is connected to a local area wireless network or a cellular network, and may inform the server 110 of any changes to the address of the device.

In general, the server 110 may be located in a remote location from the remote network 101, but as described above, the server 110 may be part of a file sharing and hosting system that stores files accessed by devices within the remote network 101. In this way, even though the server 110 is remote from the remote network 101, the server 110 has a large amount of information about the devices that are connected to one another in the remote network 101, as well as about the files that the devices in the remote network 101 commonly access. In an example, the server 110 may receive information from two devices in the remote network 101 (e.g., at nodes A and B) indicating that each device is associated with the same particular organization, such as a company or a school. Upon receiving information that both devices are associated with the same organization, the server 110 may request that the devices attempt to communicate with each other.

The above description in relation to FIG. 2 is relevant for obtaining information about a remote network and forming a model of the remote network and its connections. The description in relation to FIGS. 3 and 4 include example ways that the server 110 may make use of this information about a remote network to provide efficient file sharing and file hosting services.

Figure 3:
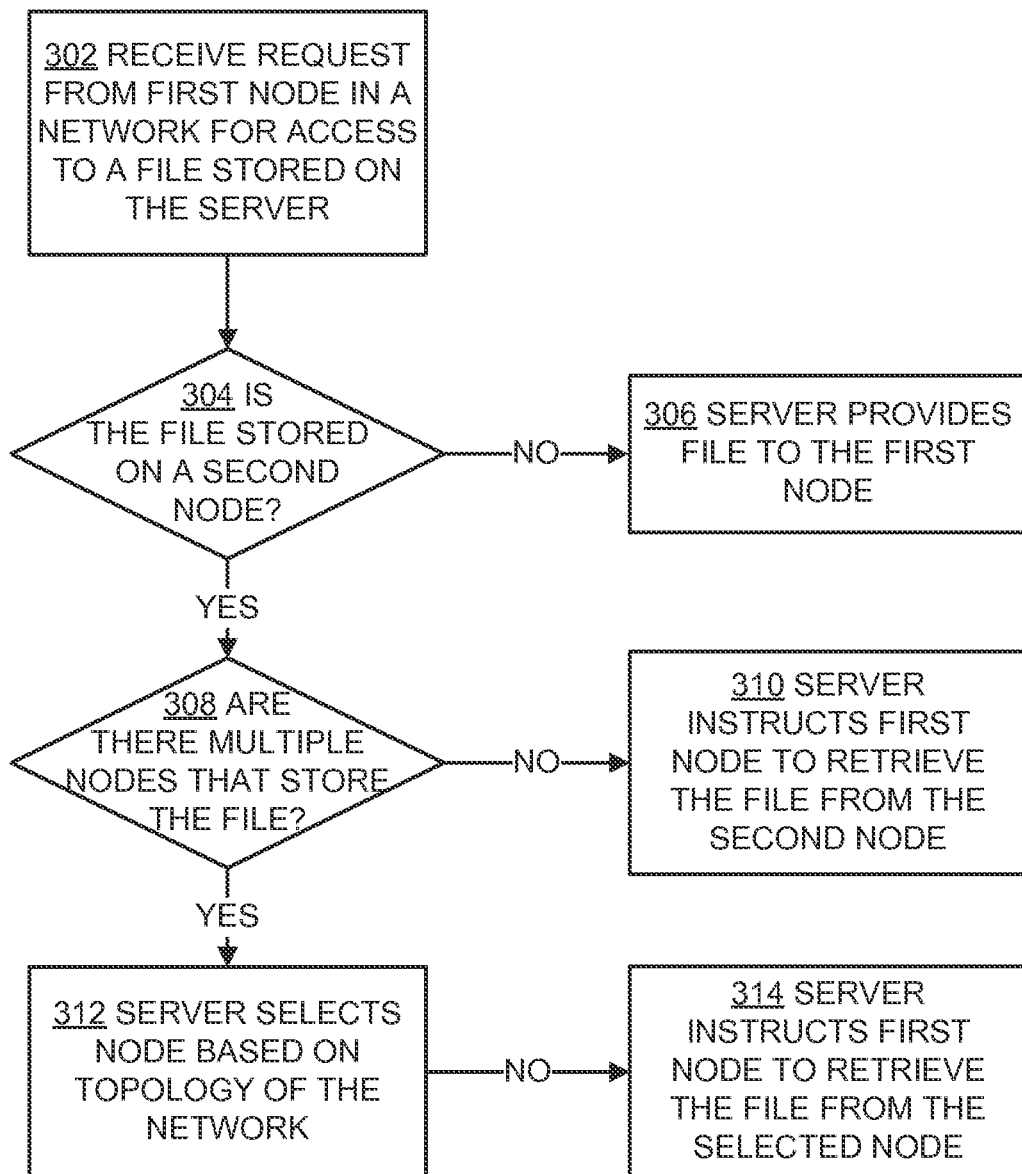
FIG. 3 is a flow chart of an illustrative method for a server to provide access to a file to a first node, according to an illustrative embodiment.

FIG. 3 is a flow chart of an illustrative method 300 for a server to interact with a node in a remote network (such as node A in the remote network 101). The method 300 includes the steps of receiving a request from a first node in a network for access to a file stored on the server (step 302) and determining whether the file is stored on a second node in the network (decision block 304). If not, the server provides the file to the first node (step 306). Otherwise, it is determined whether there are multiple nodes that store the file (decision block 308). If not, the server instructs the first node to retrieve the file from the second node (step 310). Otherwise, the server selects a node from the set of multiple nodes that store the file, based on the topology of the network (step 312) and instructs the first node to retrieve the file from the selected node (step 314).

At step 302, the server 110 receives a request from a first node (e.g., the node A) in the remote network 101 for access to a file stored on the server 110. In particular, the server 110 may correspond to a web-based file sharing and storage system that uses cloud storage to store user files. The user at node A may transmit a request to the server 110 for access to one of the user's files that are stored in cloud storage.

At decision block 304, the server 110 determines whether the file requested at step 302 is already stored locally on another node in the same network 101 as the requesting node. In particular, the server 110 may keep track of which files are locally cached on the devices at the various nodes. For example, the user at node A may have previously accessed the requested file at node B, and the device at node B may have a local version of the requested file cached in its memory. In this case, the server 110 may have data indicating that node B has a local version of the requested file. However, if the server 110 determines that no other nodes in the remote network 101 have a local version of the requested file, the method 300 proceeds to step 306, where the server provides the requested file to the first node A.

Otherwise, if the server 110 determines that at least one other node has a local version of the requested file cached, the server 110 determines whether there are multiple nodes that store the file at decision block 308. If there is only a single node that has cached the local version of the requested file, the method 300 proceeds to step 310, where the server instructs the first node (e.g., node A) to retrieve the file from the only node that stores the local version (e.g., node B).

Otherwise, when there are multiple nodes that each store the local version of the requested file, the server 110 selects one of the nodes based on the topology of the remote network 101 at step 312. For example, the selected node may be the node that has the shortest delay to the first node A, the node with the most reliable link to the first node A, the node with the strongest connectivity to all of the nodes in the remote network 101, or any suitable combination of these factors. Upon selecting an appropriate node at step 312, the server instructs the first node to retrieve the requested file from the selected node at step 314.

Without the systems and methods of the present disclosure, the server 110 may not have any knowledge of the topology of the network 101, and therefore may be unable to determine whether any of the nodes in the network 101 are capable of communicating with one another. Without this information, if the first node A requested access to a file, the first node A would have needed to retrieve the file from the server 110. This may be undesirable if the connection between the first node A and the server 110 is expensive, unreliable, or slow. For example, the connection between the first node A and the server 110 may be over a cellular network over which data transfers are expensive and time consuming. However, if the server 110 has information about the topology of the network 101 as well as information about which nodes have locally cached versions of which files, the server 110 can instruct a requesting node to access the locally cached versions of a file over the local network connections (such as a local wireless network, for example), rather than using the connection between the first node and the server 110. In general, these local network connections may be cheaper, more reliable, and faster than the connection between the first node and the server 110. In this way, the systems and methods of the present disclosure allow for bandwidth and time savings by allowing devices to communicate locally rather than using remote network connections. This is especially important in certain geographic locations where internet connections are slow and local networks are significantly more reliable and faster.

Figure 4:
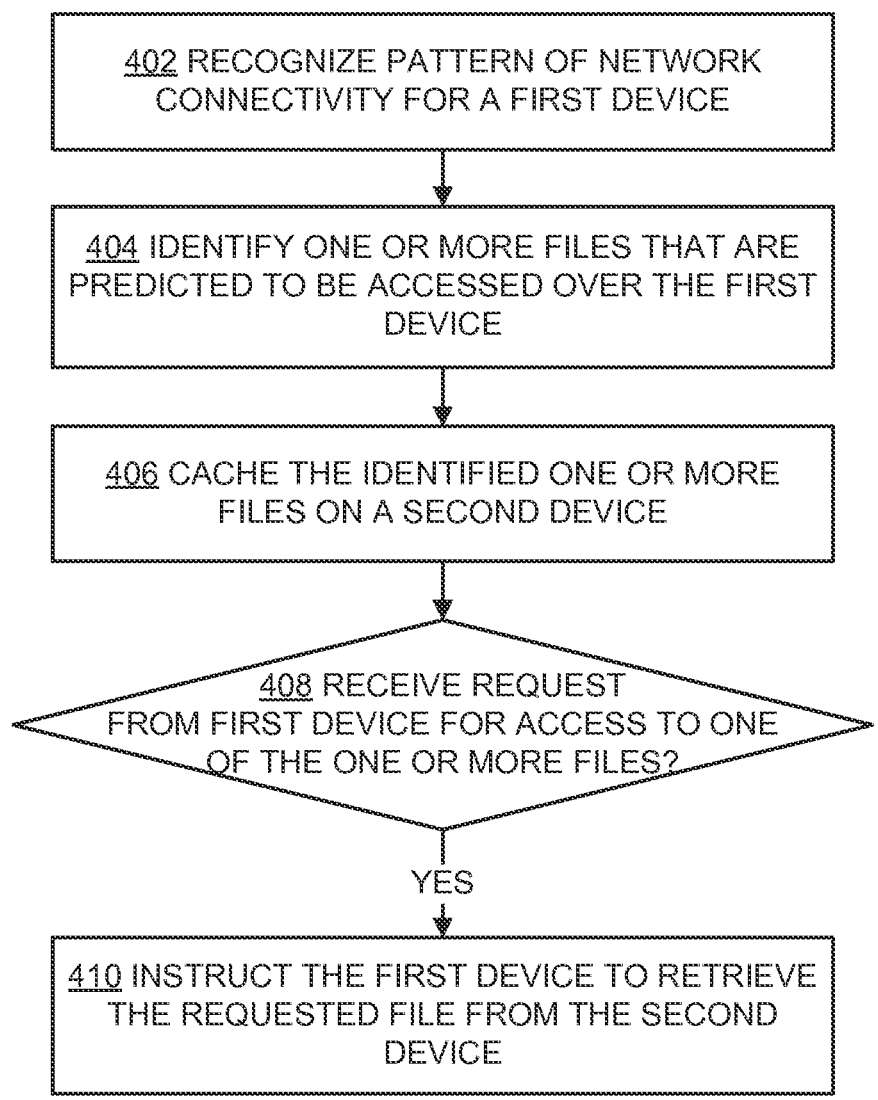
FIG. 4 is a flow chart of an illustrative method for a server to anticipate a first device to request access to a file, and to cache the file on a second device prior to receiving the request, according to an illustrative embodiment.

FIG. 4 is a flow chart of an illustrative method 400 for a server to anticipate actions by a device at a node in a remote network (such as node A in the remote network 101). The method 400 includes the steps of recognizing a pattern of network connectivity for a first device (e.g., a mobile device such as a phone at the node A, step 402), identifying one or more files that are predicted to be accessed over the first device (step 404), and caching the identified one or more files on a second device (e.g., a computer at the node B, step 406). When a request is received from the first device for access to one of the one or more cached files (decision block 408), the server instructs the first device to retrieve the requested file from the second device (step 410).

At step 402, the server 110 recognizes a pattern of network connectivity for a first device, such as a phone at the node A in the remote network 101. The pattern of network connectivity may be a temporal pattern, such that the server 110 identifies that a first device is connected to the remote network 101 during certain times of the day or week, and not connected during other times. In one example, the first device is a mobile device such as a phone, which may travel with a user during business hours to the user's workplace. The phone may connect to a network at the user's workplace when the user is at work. Additionally, the user may have a desktop computer that he leaves at the workplace and is always connected to the workplace's network. The phone may be a device at the node A, and a desktop computer at the workplace may be a device at the node B. The server 110 may identify that the phone (e.g., node A) tends to be in the workplace and connected to the workplace's network (e.g., the remote network 101) during business hours.

At step 404, the server 110 identifies one or more files that are predicted to be accessed over the first device. As described above, the server 110 may be part of a web sharing and file hosting system that stores user files on the server 110 and, upon user authentication at the first device, provides access to the user files to the first device. In an example, the user may access a particular file that is stored on the server 110 over his home computer or another device at night. Based on the information that the user accessed the particular file, as well as the pattern recognized at step 402, the server 110 may predict that the user will wish to access that same file in the user's workplace on the next day.

At step 406, the one or more files that were identified at step 404 are cached on a second device at a second node (e.g., node B) in the remote network 101. Continuing with the example described above, the second node B may be the user's office computer at his workplace, and the one or more files are cached on the user's office computer. In this way, the server 110 is configured to anticipate which files the user may wish to access when the user is at his workplace, and caches these files on the user's office computer so that the user can have immediate access to these files without having to wait for the files to download from the server 110. In general, office computers tend to have a large amount of available storage space as well as fast network access. The server 110 may recognize that the device at the second node B is a computer, and so may cache a larger amount of files on the device than if the device were a device with more storage constraints, such as a phone or a tablet. If the device were smaller, such as a phone or a tablet, the server 110 would need to be somewhat selective regarding what can or should be cached on the device because of the device's limited storage space and its slower connection speeds.

At decision block 408, the server 110 receives a request from the first device to access one of the one or more files identified at step 404. Continuing with the example described above, the user may request to access the file over his phone (e.g., node A). Then, at step 410, the server 110 instructs the first device (e.g., the phone at node A) to retrieve the requested file from the second device (e.g., the office computer at node B). Because the requested file has already been locally cached on the user's office computer and the user's phone and the office computer are connected to the same remote network 101, the phone may retrieve the file from the office computer over a faster connection than if the file were transferred from the server 110 to the remote network 101.

In some embodiments, the steps described in relation to FIG. 4 are applied to an environment in which multiple users access the same file or files that are typically stored on the server 110. Without the network model of the topology of the remote network 101, a copy of the shared file would need to be stored locally on each user's computer. However, because the server 110 has an understanding of the topology of the remote network 101, the server 110 may select one or more particular nodes in the remote network 101 to keep the shared file locally cached. The server 110 may then instruct other nodes in the remote network 101 to retrieve the file from the node that has the file cached. In this way, the remote network topology discovery tool described herein effectively saves on storage costs by allowing for a single copy of a file to be stored on one node in the network, rather than requiring each node to store a copy of the file. While the example described in relation to FIG. 4 is within a workplace setting, one of ordinary skill in the art will understand that the systems and methods described herein are generally applicable to any setting in which multiple users that are connected to the same network would want to access the same file.

Figure 5:
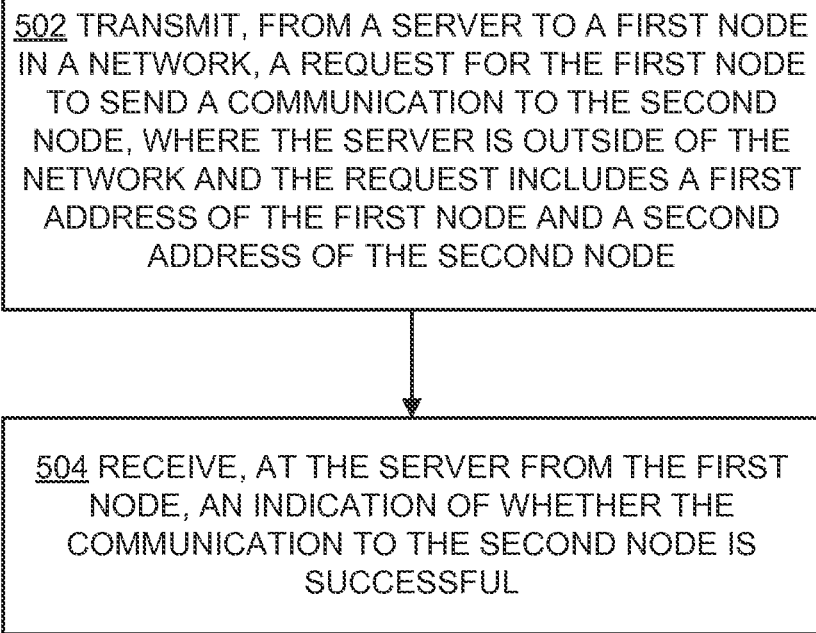
FIG. 5 is a flow chart of an illustrative method for a server to request information regarding the topology of a remote network, according to an illustrative embodiment.

FIG. 5 is a flow chart of an illustrative method 500 for a server to communicate with a node in a remote network (such as node A in the remote network 101). The method 500 includes the steps of transmitting, from the server 110 to the first node A, a request for the first node A to send a communication to a second node B in the remote network 101, where the server 110 is outside of the network 101, and the request includes a first address of the first node A and a second address of the second node B (step 502), and receiving, at the server from the first node A, an indication of whether the communication to the second node B is successful.

At step 502, the server 110 transmits to the first node A a request for the first node A to send a communication to the second node B in the remote network 101, where the server 110 is outside of the network 101, and the request includes a first address of the first node A and a second address of the second node B.

At step 504, the server 110 receives from the first node A an indication of whether the communication to the second node B is successful. In addition to the indication of whether the communication was successful, the server 110 may receive further information about the communications link between the nodes A and B. For example, the link delay may include information of whether the link is asymmetric, as is described above in relation to FIG. 2. In particular, transmission on the link in one direction (e.g., from node A to node B) may be faster than transmission on the link in the opposite direction (e.g., from node B to node A). These delays may be computed by a difference between timestamps.

In some embodiments, the server 110 is part of a file sharing system. In an example, a user at the first node A of the remote network 101 requests access to a file that is stored in cloud storage on the server. The server 110 may have information regarding the topology of the remote network 101 and data indicating that at least one other node (e.g., the second node B) of the remote network has a version of the requested file cached locally. In this case, the server 110 may instruct the first node A to request the file from the second node B that has the file cached. In this manner, the remote connection between the server 110 and the first node A is not used for transferring the file, and instead the file may be transferred to the first node A over a reliable, local, and fast connection within the remote network 101.

In some embodiments, the server 110 is configured to anticipate that a user may request access to a particular file on the server 110, and may use the topology of the remote network 101 to pre-emptively cache the file on a selected node in the remote network 101. As is described in detail in relation to FIG. 4, the server 110 may identify a temporal pattern of network connectivity for a first device at the first node A. This temporal pattern may include an indication that the first node enters and exits the remote network 101 on a regular basis, such as at particular times of the day or week. The server 110 may also identify a file that is stored on the server 110 as being previously accessed by the first node A, such as a file that the user accessed over the first node A while being away from the remote network 101. Since it is likely that a user will wish to access a file that was recently accessed, the server 110 may anticipate that the first node A will request to access the file while the first node A is connected to the remote network 101. In response to recognizing that this event is anticipated, the server 110 may pre-emptively cache the file on another device at the second node B in the remote network 101, and instruct the first node A to retrieve the file from the second node B, rather than from the server 110.

In some embodiments, the server 110 determines that the second node has more storage capacity than the first node. In particular, during the process of discovering the topology of the remote network 101, the server 110 may receive information indicative of the device type at each node in the remote network 101. Devices that are computers or similar user devices may be associated with larger storage capacities than other types of devices, such as mobile devices like phones or tablets. As described above, the server 110 may pre-emptively cache the file (that is anticipated to be requested by the first node A) at the second node B when the server 110 determines that the device at the second node B has a large storage capacity.

Figure 6:
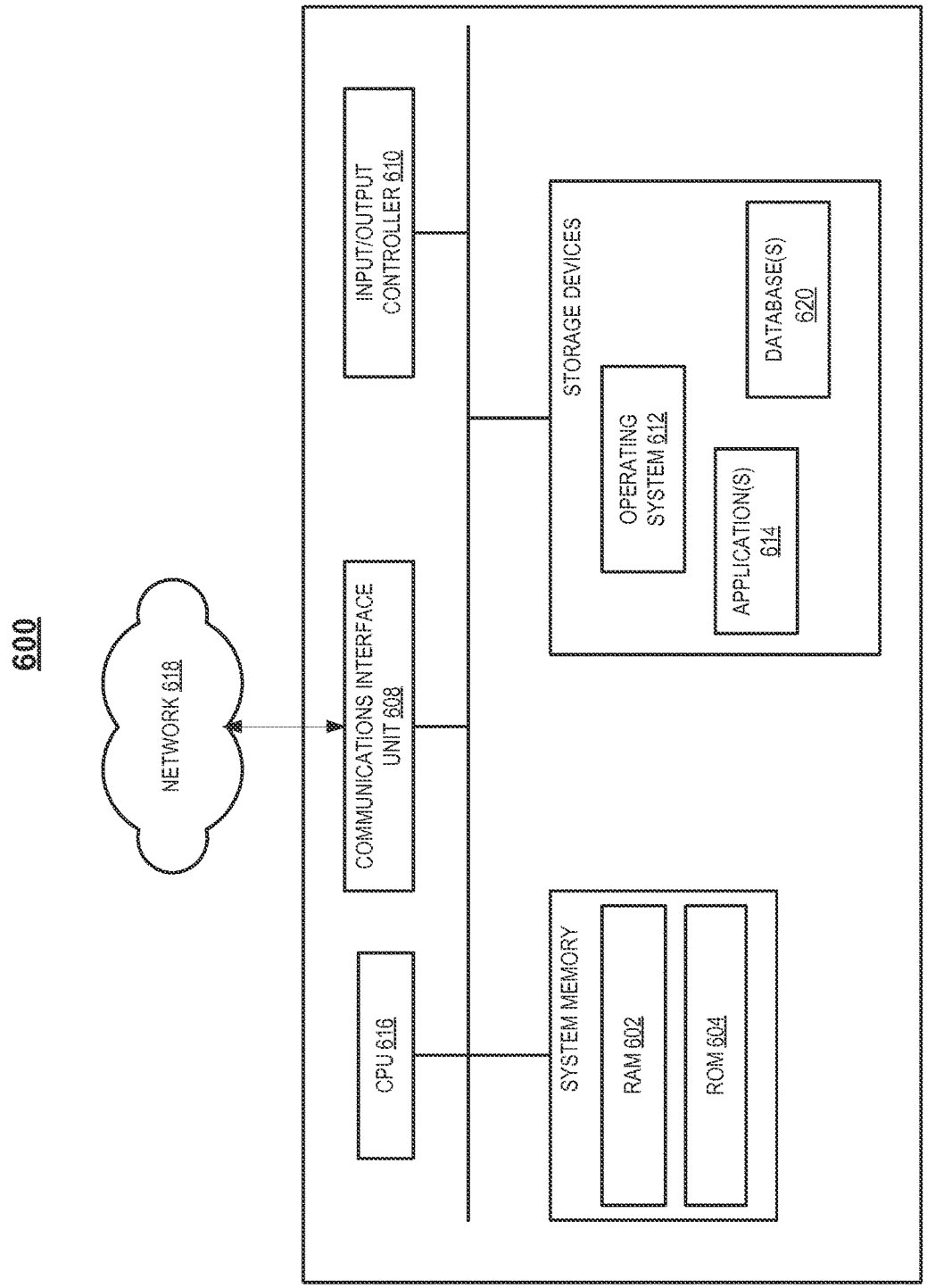
FIG. 6 is a block diagram of a computing device for performing any of the processes described herein, according to an illustrative embodiment.

FIG. 6 is a block diagram of a computing device, such as any of the components of the system of FIG. 1, for performing any of the processes described herein. Each of the components of these systems may be implemented on one or more computing devices 600. In certain aspects, a plurality of the components of these systems may be included within one computing device 600. In certain implementations, a component and a storage device may be implemented across several computing devices 600.

The computing device 600 comprises at least one communications interface unit, an input/output controller 610, system memory, and one or more data storage devices. The system memory includes at least one random access memory (RAM 602) and at least one read-only memory (ROM 604). All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 is linked, via network or local network, to other servers or systems.

The computing device 600 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 608 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers or client terminals.

The CPU 606 is also in communication with the data storage device. The data storage device may comprise an appropriate combination of magnetic, optical or semiconductor memory, and may include, for example, RAM 602, ROM 604, flash drive, an optical disc such as a compact disc or a hard disk or drive. The CPU 606 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 620 adapted to store information that may be utilized to store information required by the program.

The operating system 612 and applications 614 may be stored, for example, in a compressed, an uncompiled and an encrypted format, and may include computer program code. The instructions of the program may be read into a main memory of the processor from a computer-readable medium other than the data storage device, such as from the ROM 604 or from the RAM 602. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 612, a database management system and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method for obtaining data about a network having a plurality of nodes, the method comprising:
    maintaining, by a server that is outside of the network and that is part of a file sharing system, information about topology of the network and information about files stored locally on individual nodes of the plurality of nodes, the information about the topology of the network identifying a plurality of links between the plurality of nodes within the network, and comprising at least one of a link delay, a link status or a link reliability for a link of the plurality of links;
    updating, by the server that is outside of the network, the information about the topology of the network, wherein the updating comprises:
        receiving, from a first node of the plurality of nodes, a first request for a first file of the files;
        determining, based on the information about the files stored locally on the individual nodes, whether the first file has been previously accessed at other nodes of the plurality of nodes;
        responsive to determining that the first file has been previously accessed at the other nodes, selecting, from the other nodes, a second node based on at least one of (i) the second node having a shortest delay to the first node, (ii) the second node having a most reliable link to the first node, or (iii) the second node having a strongest connectivity to the plurality of nodes in the network;
        transmitting, from the server to the first node, a second request for the first node to send a communication to the second node, wherein:
            the second request includes a first address of the first node and a second address of the second node, and instructs the first node to obtain the first file from the second node;
        receiving, at the server from the first node, an indication of whether the communication to the second node is successful, wherein the communication to the second node occurred via a third address that is different from the second address; and
        updating, by the server, at least one of a link delay, a link status, a link reliability for a link between the first node and the second node, or the second address of the second node based on the received indication; and
    upon receiving, at the server from the first node, a third request for access to a second file stored on the server:
        determining, based on the information about the files stored locally on the individual nodes, that the second file has been previously accessed at the second node;
        identifying, based on the updated information about the topology of the network, the at least one of the link delay, the link status or the link reliability for the link between the first node and the second node; and
        based on the identifying, deciding either to transmit the second file to the first node from the server or to instruct the first node to obtain the second file from the second node.

2. The method of claim 1, wherein:
    identifying, based on the updated information about the topology of the network, the at least one of the link delay, the link status or the link reliability for the link between the first node and the second node comprises determining that the at least one of the link delay, the link status or the link reliability for the link between the first node and the second node indicates that the communication to the second node is successful; and
    the method further comprises transmitting, from the server to the first node, an instruction to retrieve the second file from the second node.

3. The method of claim 1, further comprising:
  identifying, at the server, a temporal pattern of the first node entering and exiting the network; and
  identifying a third file that is stored on the server as being previously accessed by the first node.

4. The method of claim 3, further comprising:
  determining that the second node has more storage capacity than the first node;
  transmitting, from the server to the second node, a copy of the third file; and
  in response to receiving a fourth request from the first node for access to the third file, transmitting an instruction to the first node to retrieve the third file from the second node.

5. The method of claim 4, wherein the determining that the second node has more storage capacity than the first node includes receiving an indication of a device type at each of the first node and the second node.

6. The method of claim 1, further comprising:
  receiving, at the server from the first node, the link delay for the link between the first node and the second node when the communication to the second node is successful; and
  updating, at the server, a network model to reflect the received indication and the received link delay.

7. The method of claim 1, wherein the network is a first network, and the second request includes a plurality of second addresses for the second node, wherein the plurality of second addresses comprises the third address and wherein each second address in the plurality of second addresses describes a location of the second node in a plurality of networks including the first network.

8. The method of claim 7, further comprising receiving, at the server from the first node, another indication of which, if any, of the plurality of second addresses was used to successfully communicate with the second node.

9. The method of claim 1, further comprising repeating the transmitting the second request to the first node at a frequency that is based on a device type of the first node.

10. A system for obtaining data about a network having a plurality of nodes, the system comprising:
  a memory at a server that is outside of the network and that is part of a file sharing system; and
  at least one computer processor at the server that is outside of the network, the processing device, coupled to the memory, to:
  maintain information about topology of the network and information about files stored locally on individual nodes of the plurality of nodes, the information about the topology of the network identifying a plurality of links between the plurality of nodes within the network, and comprising at least one of a link delay, a link status or a link reliability for a link of the plurality of links;
  update the information about the topology of the network, wherein to update the information about the topology of the network, the at least one computer processor is to:
    receive, from a first node of the plurality of nodes, a first request for a first file of the files;
    determine, based on the information about the files stored locally on the individual nodes, whether the first file has been previously accessed at other nodes of the plurality of nodes;
    responsive to determining that the first file has been previously accessed at the other nodes, select, from the other nodes, a second node based on at least one of (i) the second node having a shortest delay to the first node, (ii) the second node having a most reliable link to the first node, or (iii) the second node having a strongest connectivity to the plurality of nodes in the network;
    transmit, to the first node, a second request for the first node to send a communication to the second node, wherein:
      the second request includes a first address of the first node and a second address of the second node, and instructs the first node to obtain the first file from the second node;
    receive, from the first node, an indication of whether the communication to the second node is successful, wherein the communication to the second node occurred via a third address that is different from the second address; and
    update at least one of a link delay, a link status, a link reliability for a link between the first node and the second node, or the second address of the second node based on the received indication; and
  upon receiving, at the server from the first node, a third request for access to a second file stored on the server:
    determine, based on the information about the files stored locally on the individual nodes, that the second file has been previously accessed at the second node;
    identify, based on the updated information about the topology of the network, the at least one of the link delay, the link status or the link reliability for the link between the first node and the second node; and
    based on the identifying, decide either to transmit the second file to the first node from the server or to instruct the first node to obtain the second file from the second node.

11. The system of claim 10, wherein to identify the at least one of the link delay, the link status or the link reliability for the link between the first node and the second node, the at least one computer processor is to determine that the at least one of the link delay, the link status or the link reliability for the link between the first node and the second node indicates that the communication to the second node is successful, and wherein the at least one computer processor is further to:
  transmit, to the first node, an instruction to retrieve the second file from the second node.

12. The system of claim 10, wherein the at least one computer processor is further configured to:
  identify a temporal pattern of the first node entering and exiting the network; and
  identify a third file that is stored on the server as being previously accessed by the first node.

13. The system of claim 12, wherein the at least one computer processor is further configured to:
  determine that the second node has more storage capacity than the first node;
  transmit, to the second node, a copy of the third file; and
  in response to receiving a third request from the first node for access to the third file, transmit an instruction to the first node to retrieve the third file from the second node.

14. The system of claim 13, wherein the at least one computer processor is configured to determine that the second node has more storage capacity than the first node by receiving an indication of a device type at each of the first node and the second node.

15. The system of claim 10, wherein the at least one computer processor is further configured to:

receive, from the first node, the link delay for the link between the first node and the second node when the communication to the second node is successful; and update a network model to reflect the received indication and the received link delay.

16. The system of claim 10, wherein the network is a first network, and the second request includes a plurality of second addresses for the second node, wherein the plurality of second addresses comprises the third address and wherein each second address in the plurality of second addresses describes a location of the second node in a plurality of networks including the first network.

17. The system of claim 16, wherein the at least one computer processor is further configured to receive, from the first node, another indication of which, if any, of the plurality of second addresses was used to successfully communicate with the second node.

18. The system of claim 10, wherein the at least one computer processor is further configured to repeat transmitting the second request to the first node at a frequency that is based on a device type of the first node.

19. A non-transitory computer-readable medium comprising instructions, which when executed by a processing device, cause the processing device to perform operations for obtaining data about a network having a plurality of nodes, the operations comprising:

maintaining, by a server that is outside of the network and that is part of a file sharing system, information about topology of the network and information about files stored locally on individual nodes of the plurality of nodes, the information about the topology of the network identifying a plurality of links between the plurality of nodes within the network, and comprising at least one of a link delay, a link status or a link reliability for a link of the plurality of links;

updating, by the server that is outside of the network, the information about the topology of the network, wherein the updating comprises:

receiving, from a first node of the plurality of nodes, a first request for a first file of the files;

determining, based on the information about the files stored locally on the individual nodes, whether the first file has been previously accessed at other nodes of the plurality of nodes;

responsive to determining that the first file has been previously accessed at the other nodes, selecting, from the other nodes, a second node based on at least one of (i) the second node having a shortest delay to the first node, (ii) the second node having a most reliable link to the first node, or (iii) the second node having a strongest connectivity to the plurality of nodes in the network;

transmitting, from the server to the first node, a second request for the first node to send a communication to the second node, wherein:

the second request includes a first address of the first node and a second address of the second node, and instructs the first node to obtain the first file from the second node;

receiving, at the server from the first node, an indication of whether the communication to the second node is successful, wherein the communication to the second node occurred via a third address that is different from the second address; and updating, by the server, at least one of a link delay, a link status, a link reliability for a link between the first node and the second node, or the second address of the second node based on the received indication; and upon receiving, at the server from the first node, a third request for access to a second file stored on the server:

determining, based on the information about the files stored locally on the individual nodes, that the second file has been previously accessed at the second node;

identifying, based on the updated information about the topology of the network, the at least one of the link delay, the link status or the link reliability for the link between the first node and the second node; and based on the identifying, deciding either to transmit the second file to the first node from the server or to instruct the first node to obtain the second file from the second node.

20. The non-transitory computer-readable medium of claim 19, wherein:

identifying, based on the updated information about the topology of the network, the at least one of the link delay, the link status or the link reliability for the link between the first node and the second node comprises determining that the at least one of the link delay, the link status or the link reliability for the link between the first node and the second node indicates that the communication to the second node is successful; and the operations further comprise transmitting, from the server to the first node, an instruction to retrieve the second file from the second node.

* * * * *